Patented Feb. 6, 1951

2,540,210

UNITED STATES PATENT OFFICE 2,540,210

ARSENICAL INSECTICIDE SAFENED WITH ZINC SULFITE

Alexander A. Nikitin, College Park, Ga., assignor to Tennessee Copper Company, New York, N. Y., a corporation of New Jersey No Drawing. Application April 22, 1948, Serial No. 22,717

6 Claims. (Cl. 167—15)

This invention relates to improvements in insecticidal compositions, and this application is a continuation in part of my prior applications Serial No. 606,879, filed July 24, 1945, now abandoned, and Serial No. 9,391, filed February 18, 1948.

The use of various forms of zinc in fungicidal and insecticidal compositions has been proposed heretofore. For example, U. S. Patent No. 2,051,910 proposes to use a complex copper-zinc silicate as a fungicide, the zinc being added to improve the physical properties of the silicate for this purpose. U. S. Patent No. 2,225,867 asserts that zinc oxide acts synergistically with copper oxide when the two are mixed and used for fungicidal purposes, whereas synergistic action is not obtained with other zinc compounds including zinc carbonate, zinc silicate and zinc oxalate. U. S. Patent No. 2,376,740 also proposes the use of basic zinc sulphate as a "safener" in calcium arsenate insecticides.

Apart from such physical and activating effects, zinc ion per se is beneficial for protection against pests. However, most zinc salts are not suitable for use in fungicidal or insecticidal compositions. Soluble zinc salts such as zinc sulphate cause a severe injury to foliage. This fact is recognized in Patent No. 2,376,740 and also in U. S. Patent No. 1,905,532 wherein zinc is proposed as an immunizing agent against certain forms of blight. In both cases the soluble zinc sulphate is accordingly converted to insoluble basic zinc sulphate by reaction with an excess of lime. Basic zinc salts such as basic zinc sulphate do not injure the plant, but on the other hand they are relatively ineffective as fungicides because they are so insoluble that they do not furnish the required amount of zinc ion.

It has been found that the zinc sulphite is very beneficial when used on plants. The chief value of zinc sulphite is that it furnishes zinc ion gradually as a result of the slow oxidation of zinc sulphite to zinc sulphate upon its exposure to atmospheric action after the compound has been used in the field. Thus the fungicidal effectiveness of zinc sulphite has been found to be much greater than that of basic zinc sulphate (zinc-Bordeaux mixture) in laboratory tests on toxicity to spore germination and in field tests on control of potato blight and pecan rosette disease. On the other hand, zinc sulphite is not only safe to use on plants but also is highly beneficial for plant growth. For example, when tested in the field against Bordeaux mixture (copper sulphate plus lime), zinc-Bordeaux mixture (zinc sulphate plus lime), basic copper sulphate, and basic copper sulphate chloride, zinc sulphite proved far superior as to increase of vine weight and increase of moisture content of the tubers.

In addition to its highly beneficial effects mentioned above, zinc sulphite has a special value for use with copper fungicides and/or arsenical insecticides. As pointed out in my prior applications, it is known that soluble copper and soluble arsenic are injurious to fruit and foliage. For this reason copper and arsenic used for fungicidal and insecticidal purposes are used in relatively insoluble forms, but nevertheless soluble fractions liberated by atmospheric action and by interaction with other ingredients of the fungicidal composition may cause injury to the plant.

My prior application Serial No. 9,321 is directed particularly to fungicides containing copper with or without organic fungicides or insecticides, arsenicals, etc. The present application, on the other hand, is directed particularly to the use of arsenical insecticides in the absence of copper. The arsenicals commonly used for such purposes include lead arsenate which is used chiefly for fruits such as apples, cherries and peaches, and tricalcium arsenate which is used chiefly for vegetables such as tomatoes. Although such arsenicals are relatively insoluble, nevertheless injury to the plant often results from liberation of soluble arsenical fractions on exposure of such relatively insoluble arsenicals to the atmosphere.

The use of zinc sulphate to prevent such injurious effects of arsenicals has been tried without success due to the high solubility of this zinc salt. The use of lime with zinc sulphate forms a basic zinc sulphate so insoluble that it does not protect the plant against such injuries. Other zinc salts such as zinc phosphate and zinc oxalate are too insoluble in water to provide protection. Zinc sulphite, in addition to its beneficial effects mentioned above, is the only zinc salt as far as I know which gives the desired protection against arsenical injury to the plant as shown by laboratory and field tests. Its effectiveness in this respect is attributed to the fact that it furnishes a sufficient concentration of zinc ion to exert a substantial buffering effect.

The effectiveness of zinc sulphite in protecting plants against arsenical injuries can be further explained as follows. As stated above, soluble zinc salts such as zinc sulphate can not be used because of severe injury to fruit and foliage. On the other hand, basic zinc salts such as obtained by the combination of zinc sulphate and lime are ineffective to prevent arsenical injuries because soluble zinc is obtained only as a result of carbonation. High calcium lime which is commonly used for this purpose does not carbonate before five or six days under ordinary atmospheric conditions, and carbonation will simultaneously cause increased solubility in arsenicals. Arsenical injuries due to the formation of soluble arsenic usually occur much ahead of the liberation of zinc ion from basic zinc sulphate. Thus soluble zinc secured from basic zinc salts does not give the desired protection in many cases, whereas zinc sulphite is much more effective as explained above.

Another important advantage of the use of zinc sulphite with arsenicals is that the zinc sulphite is compatible with virtually all organic insecticides and fungicides and does not require the addition of alkaline materials such as lime, as is the case with other soluble zinc salts. It has been found that in most cases alkaline materials such as lime or sodium or potassium carbonates or hydroxides have an adverse effect on these organic materials, reducing the effectiveness of organic fungicides such as disodium ethylene bis-dithiocarbamate (Dithane) and decomposing organic insecticides such as pyrethrum, rotenone and nicotine products. Thus in the case of combination treatments using arsenicals with organic fungicides and/or insecticides, the use of zinc sulphate plus lime is highly undesirable, but zinc sulphite can be used to reduce arsenical injuries without adverse effects on the organic materials.

The protective action of zinc sulphite against arsenical injuries as mentioned above is highly effective. However, the zinc sulphite has a tendency to oxidize to zinc sulphate, decreasing the amount of zinc sulphite available for protective action, and forming increasing amounts of zinc sulphate which in turn increases the solubility of arsenicals. The soluble zinc sulphate itself and the soluble arsenic as well are injurious to fruit and foliage, and the injury may become severe when the zinc sulphite is exposed to atmospheric action for considerable periods or when the composition is held in storage before use. In such cases the protective action of the zinc sulphite may be prolonged by the use of aluminum oxide or iron oxide which greatly diminishes the oxidation of zinc sulphite to zinc sulphate and minimizes the injuries to fruit and foliage.

It should be noted that the aluminum oxide or iron oxide when used alone, i. e., without zinc sulphite, does not have beneficial value in relation to arsenical injuries. Its value lies in prolonging the effectiveness of the zinc sulphite by minimizing its tendency to oxidize to zinc sulphate. This protective action of aluminium oxide, iron oxide, or a mixture of these two substances is most likely due to a buffering action, since aluminum oxide or iron oxide has a neutral reaction; that is, their suspension in water has a pH of about 7 and neither aluminum oxide nor iron oxide reacts readily with common salts, including zinc sulphite. Hence it will be understood that the oxide is not necessary but is desirable to prolong the effectiveness of the zinc sulphite after application to the plant and especially when the composition is stored for long periods before use.

The amount of zinc sulphite to be used may vary considerably. It depends mainly on the amount of arsenical used but will vary according to the type of arsenical, the character of the inert diluents used in the dust or spray, and also the type of plant on which the dust or spray mixture is used. Furthermore it will be understood that the amount of protective action obtained increases progressively as the amount of zinc sulphite is increased up to a maximum amount beyond which no further increase of protective action is obtained. Some degree of protective action will be obtained with only very small amounts of zinc sulphite, but as a rule the minimum amount should be about 30% of the amount of arsenical. In the case of less injurious arsenicals such as lead arsenate, about 30–40% zinc sulphite will usually be sufficient, but in the case of more injurious arsenicals such as tricalcium arsenate, larger amounts of zinc sulphite up to 60–70% are desirable. Still larger amounts can be used, but usually to no advantage because no additional protection will be obtained.

When aluminum oxide is used to prolong the protective action of the zinc sulphite, the ratio of oxide to zinc sulphite may also vary within wide limits. However, it will usually be undesirable for this ratio to exceed 1:4 (oxide to zinc sulphite), as increases in the proportion of oxide beyond this ratio will not increase the protection afforded the zinc sulphite. The ratio of oxide may be decreased to as little as 1:14 and substantial benefit still obtained. The corresponding ratios in the case of iron oxide will depend on the composition of the oxide used. For example, in the case of iron oxide consisting of about one-third ferrous oxide and two-thirds ferric oxide, the ratio should be approximately the same as in the case of aluminum oxide.

The following are examples of suitable compositions which may be used in dust mixtures with talc, clay or the like as diluents: It will be understood that when the oxide is not desired, it will simply be omitted.

(1) 3 lbs. lead arsenate (PbH AsO$_4$)
    1 lb. zinc sulphite
    0.25 lb. aluminum oxide
(2) 3 lbs. tricalcium arsenate
    2 lbs. zinc sulphite
    0.5 lbs. aluminum oxide As previously stated, combinations of zinc sulphite with arsenicals such as indicated by the above examples can be used with organic insecticides and/or fungicides as may be desired. For example, DDT and lead arsenate are used for the control of curculio on peaches and have also been used on apples with surprising effectiveness against coddling moth larvae. In such cases the combined treatment with DDT and lead arsenate may be used with the addition of zinc sulphite which serves as a buffer against arsenical injury and reduces damage to twigs and foliage. The combination of lead arsenate and nicotine sulphate is recommended in general summer fruit spray schedules, and zinc sulphite may be used in such combinations to reduce arsenical injury. Zinc sulphite is also compatible with nicotine-bentonite (Black Leaf 155) and may be used effectively to render lead arsenate safer in lead arsenate-nicotine treatments.

The fact that zinc sulphite does not require the addition of lime makes it advantageous for use in the above combinations of arsenicals and organic insecticides as compared with zinc sulphate plus lime which often causes deleterious effects. The same advantage is obtained by the addition of zinc sulphite to combinations of arsenicals with organic fungicides. For example, disodium ethylene bisdithiocarbamate (Dithane) is commonly used in combination with calcium arsenate and zinc sulphate-lime for the control of tomato diseases and insects. By using zinc sulphite, the need for lime is eliminated. Thus the deleterious effects of lime on the organic insecticides are avoided, and the zinc sulphite also serves as a buffer against soluble arsenic in the arsenical insecticides.

In most cases it will be desirable to mix the zinc sulphite with the other ingredients of the composition so that all may be applied to the plant simultaneously in a single dusting or spraying operation. It is possible, however, to apply the zinc sulphite to the plant separately. In this case the zinc sulphite application may either precede or follow the arsenical application but the two applications should be made substantially simultaneously; i. e., no more than one or two days should be permitted to intervene if the above mentioned benefits of conjoint use are to be obtained.

It will also be understood that the proportions of the above examples are only illustrative and may vary widely under different conditions. Hence reference should be had to the appended claims for a definition of the limits of the invention.

What is claimed is:

1. A composition for application to plant foliage and fruit for the control of pests which contains zinc sulphite together with an arsenical insecticide.

2. A composition for application to plant foliage and fruit for the control of pests which contains zinc sulphite and a protective oxide selected from the group consisting of aluminum and iron oxides together with an arsenical insecticide.

3. A composition for application to plant foliage and fruit for the control of pests which contains zinc sulphite together with an arsenical insecticide and an organic fungicide.

4. A composition for application to plant foliage and fruit for the control of pests which contains zinc sulphite together with an arsenical insecticide and an organic insecticide.

5. A composition for application to plant foliage and fruit for the control of pests which contains zinc sulphite and a protective oxide selected from the group consisting of aluminum and iron oxides together with an arsenical insecticide and an organic fungicide.

6. A composition for application to plant foliage and fruit for the control of pests which contains zinc sulphite and a protective oxide selected from the group consisting of aluminum and iron oxides together with an arsenical insecticide and an organic insecticide.

ALEXANDER A. NIKITIN.

REFERENCES CITED

The following references are of record in the file of this patent:

UNITED STATES PATENTS

| Number | Name | Date |
|---|---|---|
| 1,626,872 | Piver | May 3, 1927 |
| 2,368,565 | Pearce et al. | Jan. 30, 1945 |
| 2,376,740 | Waters et al. | May 22, 1945 |

OTHER REFERENCES

Heuberger et al., Del. Agr. Expt. Sta. Pamphlet 10, 1944, obtained through Frear, "Chemistry of Insecticides, Fungicides, and Herbicides," Van Nostrand Co. Inc., New York (1948), page 266.